United States Patent [19]

Christidis et al.

[11] 4,052,364

[45] Oct. 4, 1977

[54] BIS(HYDROXY-DI-TERT.BUTYLPHENYL)-ALKANOIC ACID ESTERS

[75] Inventors: Yani Christidis, Paris, France; Otto Mauz, Liederbach, Taunus; Eberhard Prinz, Kelkheim, Taunus, both of Germany

[73] Assignees: Nobel Hoechst Chimie, Puteaux, France; Hoechst Aktiengesellschaft, Frankfurt am Main, Germany

[21] Appl. No.: 545,532

[22] Filed: Jan. 30, 1975

[30] Foreign Application Priority Data

Feb. 1, 1974  France ................................ 74.03523

[51] Int. Cl.$^2$ .......................................... C07C 69/76
[52] U.S. Cl. ............................... 260/45.85 B; 560/57
[58] Field of Search .................... 260/473 S, 45.85 B

[56] References Cited

U.S. PATENT DOCUMENTS 3,206,431  9/1965  Doyle et al. .................... 260/473 R

FOREIGN PATENT DOCUMENTS

| 1,934,902 | 1/1971 | Germany | 260/473 R |
| 1,163,017 | 2/1964 | Germany | 260/473 R |
| 42-7789 | 3/1967 | Japan | 260/473 R |

*Primary Examiner*—Paul J. Killos
*Attorney, Agent, or Firm*—Curtis, Morris & Safford

[57] ABSTRACT

Bis(hydroxyphenyl)-alkanoic acid esters the phenyl radicals of which are alkylated twice are prepared by alkylation of corresponding compounds carrying one alkyl radical at the nucleus, using isobutylene as alkylating agent. The alkanoic acid esters are obtained in crystalline form and are suitable as stabilizers for polyolefins.

3 Claims, No Drawings

BIS(HYDROXY-DI-TERT.BUTYLPHENYL)-ALKANOIC ACID ESTERS

The present invention relates to bis(hydroxy-di-tert-butyl-phenyl)-alkanoic acid esters, to a process for preparing them in a crystalline state and to their use as polyolefin stabilizers.

It is known that diphenyl-alkanoic acid esters are effective as stabilizers for polyolefins. The phenol derivatives used can be substituted by alkyl radicals once or twice at the nucleus (cf. German Patent Specifications 1,163,017 and 1,934,902). It is also known that bisphenol derivatives, the phenyl radicals of which do not carry any substituent besides the hydroxyl group, can be alkylated two times at the nucleus by reacting them with isobutylene. According to this process crystalline mono-ester compounds are obtained, inter alia, which are used as antioxidants for polyolefins (cf. Japanese Specification 42-7789).

The present invention provides crystalline bis(hydroxy-di-tert-butylphenyl)-alkanoic acid diesters of the formula I

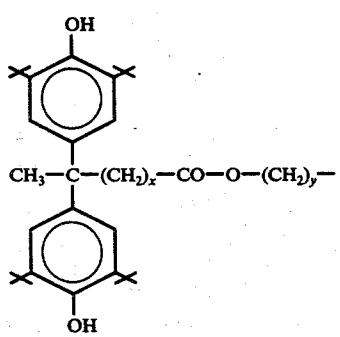

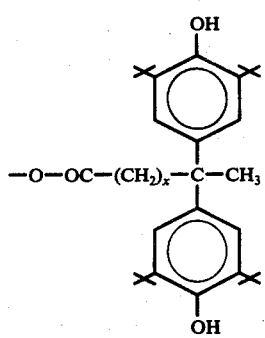

in which $x$ is zero or a whole number in the range of from 1 to 8 and $y$ is a whole number in the range of from 2 to 18.

The present invention also provides a process for the manufacture of crystalline bis(hydroxy-di-tert-butylphenyl)-alkanoic acid diesters, which comprises reacting a bis(hydroxy-tert-butylphenyl)-alkanoic acid diester of the formula II

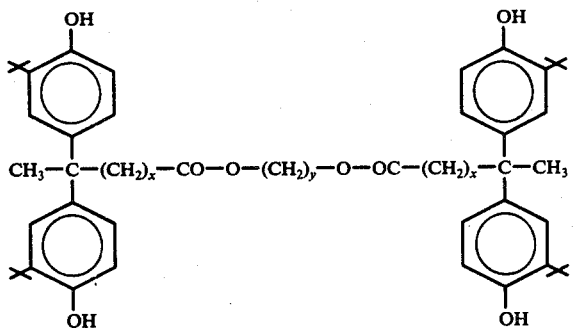

in which $x$ and $y$ have the meanings given for formula I, with isobutylene at a temperature in the range of from 20 to 80° C, preferably 50 to 75° C, in the presence of an organic solvent and Friedel-Crafts catalyst, preferably a protonic acid.

The compounds of the invention are diesters of an alkanoic acid having from 3 to 11 and preferably 4, 5, 6 or 7 carbon atoms and carrying two 4-hydroxy-3,5-di-tert-butylphenyl radicals at the second to last carbon atom with a diol having from 2 to 18 and preferably 2 to 6 carbon atoms; especially useful are compounds of the above formula I in which $x$ is 1, 2, 3 or 4 and $y$ stands for 2, 3, 4, 5 or 6.

There are listed as examples the diesters of 2,2-bis(4-hydroxy-3,5-di-tert-butylphenyl)-propanoic acid, 3,3-bis(4-hydroxy-3,5-di-tert-butylphenyl)-butanoic acid, 4,4-bis(4-hydroxy-3,5-di-tert-butylphenyl)-pentanoic acid, 5,5-bis(4-hydroxy-3,5-di-tert-butylphenyl)-hexanoic acid, or 6,6-bis(4-hydroxy-3,5-di-tert-butylphenyl)-heptanoic acid with 1,2-ethanediol, 1,3-propanediol, 1,2-propanediol, 2,2-dimethyl-1,3-propanediol, 1,4-butanediol, 1,5-pentanedeiol, 1,6-hexanediol, 1,10-decanediol, 1,12-dodecanediol, or 1,18-octadecanediol; especially useful are the diesters of the substituted butanoic acid with 1,2-ethanediol, 1,3-propanediol, 1,4-butanediol, or 1,6-hexanediol.

The starting materials used for making the compounds of the invention are prepared in known manner, for example by condensation of o-tert-butylphenol with a diester of a ketocarboxylic acid having from 3 to 11 and preferably 4, 5, 6, or 7 carbon atoms with a diol having from 2 to 18 and preferably 2 to 6 carbon atoms. Suitable ketocarboxylic acids are, for example, pyruvic acid, acetoacetic acid, 3-keto-butanoic acid, 4-keto-pentanoic acid, 5-keto-hexanoic acid and 6-keto-heptanoic acid. The diesters are obtained by direct reaction of the free acid with diol or by ester interchange of a keto-carboxylic acid mono-ester with a diol. The preferred diester of acetoatic acid with 1,2-ethanediol can be obtained in an especially pure state by reacting the diol with diketene. The condensation of the phenol with the diester is carried out in the presence of a catalyst. Preferred catalysts are one or several mercaptans having from 1 to 6 carbon atoms, for example methyl-mercaptan, ethyl-mercaptan, propyl-mercaptan, or butyl-mercaptan.

The compounds of the invention are pepared by alkylation of a diester of an alkanoic acid having from 3 to 11 carbon atoms, preferably 4, 5, 6, or 7 carbon atoms, and carrying at the second to last carbon atom twice the 4-hydroxy-3-tert-butyl-phenyl radical, with a diol having from 2 to 18 and preferably 2 to 6 carbon atoms. As alkylating agent isobutylene is used. The alkylation is generally effected at atmospheric pressure in the presence of an organic solvent and an acid catalyst. As solvent an aromatic hydrocarbon having from 6 to 9 carbon atoms is preferably used, for example benzene, toluene, xylene, or ethylbenzene. Suitable catalysts are preferably protonic acids, for example sulfuric acid, phosphoric acid, or a hydrogen halide, such as hydrogen chloride, hydrogen fluoride, or hydrogen bromide. The catalyst is advantageously used in an amount of from 1 to 8 and preferably 3 to 5% by weight, calculated on the compound to be alkylated.

The alkylated products, which are obtained in the form of a solvate after neutralization of the catalyst and removal of the solvent, are generally recrystallized and after elimination of the solvent (dissolvation) they are obtained in the pure crystalline state. For dissolvation the product is generally dried at a temperature of from 50° to 180° C, preferably 80° to 150° C, advantageously under reduced pressure or under an inert gas, for example nitrogen. After dissolvation the compounds of the invention are obtained in the form of a crystalline powder having a particle size below 100 microns (average diameter).

The compounds of the invention are excellently suitable as stabilizers for polyolefins, for example polystyrene, high density polyethylene, low density polyethylene and especially polypropylene. They are effective not only as anti-oxidants but also as light protecting agents, particularly against the action of ultraviolet light. Moldable compositions on the basis of polyolefins containing 0.005 to 5.0 and preferably 0.01 to 2.0% by weight of a compound of the invention, calculated on the total weight of the moldable composition, are suitable as thermoplastic materials. If desired, the stabilizers according to the invention can be used together with further stabilizers, such as organic sulfur compounds, for example thio-dicarboxylic acid diesters or thioethers, or alkaline earth metal salts of aliphatic carboxylic acids, for example calcium stearate.

The following examples illustrate the invention.

EXAMPLE: 1 a. A reactor having a volume of 6 liters and provided with stirrer, thermometer, gas inlet and means for vacuum distillation was charged with 2,440 g (16 moles) of o-tert-butylphenol. At room temperature a mixture of 516.2 g (2 moles) of acetoacetic acid 1,4-butanediol diester, 1 g of methyl-mercaptan and 1 g of ethyl-mercaptan was added dropwise. After cooling to 20° C, the resulting mixture was saturated with dry hydrogen chloride while stirring and maintained at 20° C for 12 hours. Next, the mixture was heated to 150° C during the course of 3 hours and under reduced pressure, whereby the unreacted components distilled off. The remaining syrup was dissolved in 2 liters of hot toluene, and the solution was filtered. After cooling to room temperature, the crystals were filtered off with suction, washed with toluene and dried under reduced pressure at a temperature of about 50° C. 1,626 g (89% of the theory) of solvated product were obtained which was recrystallized from toluene. The white solvated crystals were dissolvated in the molten state under reduced pressure. The elementary analysis of the dissolvated product gave the following values:

C, Calculated: 75.9%; H, calculated 8.58%. C, Found: 75.8%; H, found 8.1%.

The 3,3-bis(4-hydroxy-3-tert-butylphenyl)-butanoic acid 1,4-butanediol diester obtained melted at 120° C.

b. 824 g of pure toluene, 13 g of sulfuric acid (specific gravity 1.84 g/cm$^3$) and 412 g of crude product obtained as described sub a) were mixed under nitrogen while vigorously stirring in a reaction vessel having a volume of 3 liters and equipped with stirrer, thermometer, gas inlet and gas outlet. At a temperature of 68°–70° C, isobutylene was introduced into the mixture for 13 hours, whereby 270 g of isobutylene were consumed, i.e. 2.5 times the theoretical amount. After cooling of the mixture to room temperature, the sulfuric acid was neutralized, the aqueous layer was separated by decantation and the toluene was distilled off under reduced pressure. The remaining crystalline magma was dissolved in boiling isopropanol and the limpid, orange coloured solution was cooled to room temperature while stirring. The separating crystals were collected on a Buchner funnel, washed with isopropanol and dried. The yield amounted to 285 g (51% of the theory).

The crystalline product was dissolved in hot acetone, precipitation was brought about by adding distilled water, and after cooling of the suspension, the crystals were separated. After drying under reduced pressure 274 g (45% of the theory) of solvated crystals were obtained. After dissolvation of the crystalline 3,3-bis(4-hydroxy-3,5-di-tert-butylphenyl)-butanoic acid 1,4-butanediol diester by heating to 90° C under reduced pressure, the elementary analysis gave the following values:

C, Calculated: 77.96%; H, calculated 9.8%. C, Found: 77.8%; H, found 9.8%.

The determination of the molecular weight indicated a value of 1,035 (calculated value 1,047). The melting point was found to be 185° – 188° C (differential thermoanalysis).

EXAMPLE: 2 a. The 3,3-bis(4-hydroxy-3-tert-butylphenyl)-butanoic acid 1,2-ethanediol diester melting at 170° C was prepared in analogy to Example 1a)

b. Under the conditions as specified in Example 1b) 275 g (2.5 times the theoretical amount) of isobutylene were introduced into a mixture of 660 g of pure toluene, 13 g of sulfuric acid and 443 g (0.5 mole) of the crude product prepared as described sub 2a). The yellow crystalline magma obtained after evaporation of the toluene was dissolved in hot isopropanol. The crystals obtained after cooling of the solution to room temperature were collected on a Buchner funnel, washed with isopropanol and dissolvated under reduced pressure at a temperature of 110° C. 286 g (56% of the theory) of 3,3-bis(4-hydroxy-3,5-di-tert-butylphenyl)-butanoic acid 1,2-ethanediol diester were obtained. The elementary analysis indicated the following values:

C, Calculated: 77.75%; H, calculated: 9.7%. C, Found: 77.5%; H, found: 9.5%.

The determination of the molecular weight gave a value of 1,000 (calculated 1,019). The product melted at 189° – 192° C (differential thermoanalysis).

EXAMPLE: 3

In the manner described in Example 1 the 3,3-bis(4-hydroxy-3-tert-butylphenyl)-butanoic acid 1,3-propanediol diester melting at 63° – 65° C was prepared. After alkylation the 3,3-bis(4-hydroxy-3,5-di-tert-butylphenyl)-butanoic acid 1,3-propanediol diester melting at 166° – 168° C (differential thermoanalysis) was obtained.

EXAMPLE: 4

In the manner described in Example 1 the 3,3-bis(4-hydroxy-3-tert-butylphenyl)-butanoic acid 1,6-hexanediol diester melting at 104° C was prepared. After alkylation the 3,3-bis(4-hydroxy-3,5-di-tert-butylphenyl)-butanoic acid 1,6-hexanediol diester melting at 147° – 149° C (differential thermoanalysis) was obtained.

EXAMPLE: 5 (example of application)

a) Commercial grade polypropylene free from stabilizer was kneaded at a temperature of 200° C with 0.1% by weight of the 3,3-bis(4-hydroxy-3,5-di-tert-butylphenyl)-butanoic acid 1,4-butanediol diester according to Example 1 and 0.1% by weight of the 3,3-bis(4-hydroxy-3,5-di-tert-butylphenyl)-butanoic acid 1,2-ethanediol diester according to Example 2, respectively, 0.25% by weight of thiodipropionic acid dilauryl ester and 0.2% by weight of calcium stearate, the percentages being calculated on the polypropylene. The compositions obtained were shaped on a press to yield 1 mm thick sheets having a U-shaped cross section, which were kept in a drying cabinet at 140° C with forced air circulation. As a measurement for the resistance to ageing the time was determined after which the sheets became brittle. For comparison, sheets prepared in like manner from compositions containing, instead of the compounds of the invention, 2,6-di-tert-butyl-4-methylphenol and bis(2-hydroxy-3-methyl-5-tert-butylphenyl)-methane, respectively, were tested. The results are indicated in the following table.

b. Sheets having a thickness of 0.1 mm were prepared from the compositions specified in Example 5a) and exposed to ultraviolet light. As a measurement for the light stability the time was determined after which the sheets became brittle. The test results are listed in the table below.

Table 1

| Stabilizer | brittle time (hrs) | |
|---|---|---|
| | a) | b) |
| of Example 1 | 1355 – 1380 | 750 |
| of Example 2 | 1325 – 1350 | 730 |
| dibutylmethylphenol | 169 – 170 | 660 |
| bis(hydroxymethyl-butylphenyl)-methane | 480 – 490 | 680 |

EXAMPLE: 6 (example of application)

At a temperature of 200° C commercial grade polypropylene free from stabilizer was mixed with 0.1% by weight of a substituted alkanoic acid ester according to the invention and 0.15% by weight of dioctadecyl monosulfide, the percentages being calculated on the polypropylene, and the mixture was granulated. The color and color stability of the composition obtained was determined in a differential colorimeter (colormaster of Manufacturing, Engineering and Equipment Corp. Hatboro, Pa., USA) prior to further processing (zero value), after a seven day storing at 140° C (a), after five granulations (b) and after exposure for 1,000 hours to irradiation (c) in a xenotest apparatus 450 (system Cassella) of Messrs. Heraeus, Hanau, Fed. Rep. of Germany (cf. leaflet of Quarzlampen GmbH, Hanau). To carry out the color measurements, 2.5 mm thick injection molded plates were used. For comparison, measurements were carried out with compositions containing, instead of the alkanoic acid esters of the invention, a correspondining ester with monoalkylated phenyl radical. The results are listed in the following table.

Table 2

| Test | stabilizer component | color stability | | | |
|---|---|---|---|---|---|
| | | zero value | a) | b) | c) |
| I | 3,3-bis(4-hydroxy-3-tert-butylphenyl)-butanoic acid 1,2-ethanediol diester | −5.1 | 22.2 | +0.1 | +7.7 |
| II | 3,3-bis(4-hydroxy-3-tert-butylphenyl)-butanoic acid 1,3-propanediol diester | −4.1 | 24.7 | +1.5 | +7.5 |
| III | 3,3-bis(4-hydroxy-3-tert-butylphenyl)-butanoic acid 1,6-hexanediol diester | −5.2 | 25.3 | 0 | +6.4 |
| 1 | according to Example 2 | −4.0 | 20.4 | −1.5 | −2.0 |
| 2 | according to Example 3 | −4.8 | 22.7 | +0.5 | −1.1 |
| 3 | according to Example 4 | −6.0 | 22.7 | −1.8 | −2.7 |

What is claimed is:

1. A crystalline bis(hydroxy-di-tert-butylphenyl)-alkanoic acid diester of the formula I

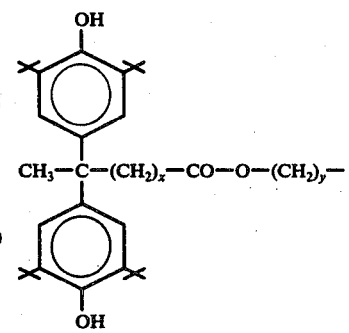

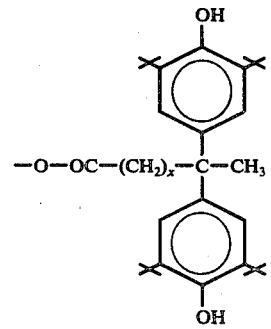

in which $x$ is zero or a whole number in the range of from 1 to 8 and $y$ is a whole number in the range of from 2 to 18.

2. A method of stabilizing a polyolefin which comprises incorporating therein from 0.005 to 5% by weight of said polyolefin of a bis(hydroxy-di-tert-butylphenyl)-alkanoic acid diester as defined in claim 1.

3. A polyolefinic thermoplastic material containing an effective amount of the compound of claim 1 as a stabilizer.